INVENTOR.
EDWARD A. AMBROSANO SR.
BY
ATTORNEY

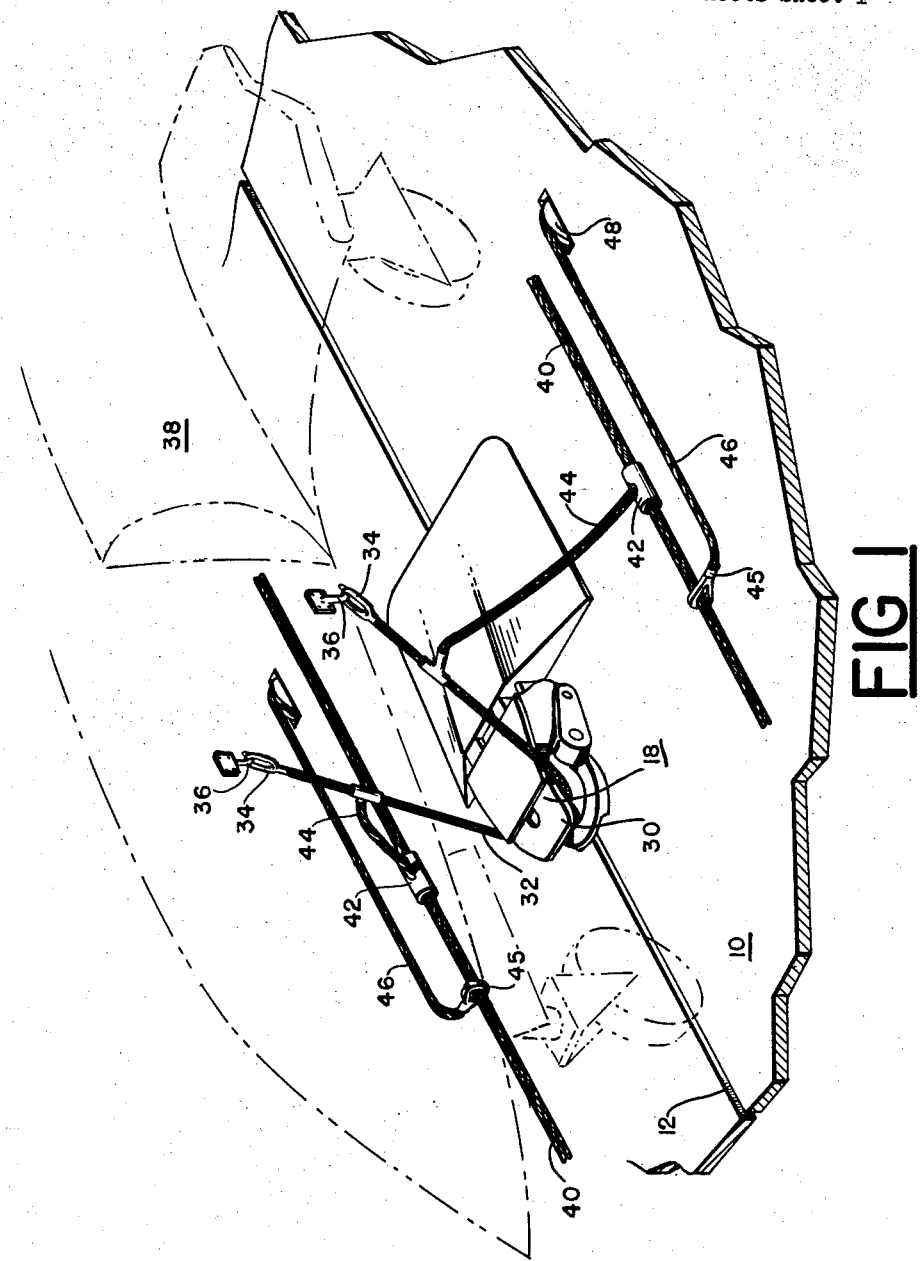

United States Patent Office 3,145,951
Patented Aug. 25, 1964

3,145,951
BRIDLE AND PENDANT ARRESTMENT
DEFLECTOR
Edward A. Ambrosano, Sr., Philadelphia, Pa., assignor to the United States of America as represented by the Secretary of the Navy
Filed May 24, 1963, Ser. No. 283,121
6 Claims. (Cl. 244—63)
(Granted under Title 35, U.S. Code (1952), sec. 266)

The invention described herein may be manufactured and used by or for the Government of the United States of America for governmental purposes without the payment of any royalties thereon or therefor.

This invention relates to aircraft launching equipment and particularly to the shuttle used in such equipment.

In catapults for launching aircraft from a take-off surface, as from the deck of a carrier, there are one or more cylinders, having longitudinal slots, disposed beneath the deck. The deck is also slotted and a shuttle hook projects through the slot and above the deck from a shuttle carriage that rides in tracks beneath the deck. A connecting device joins the shuttle carriage through the cylinder slot with the piston within it. When the catapult is fired, movement of its piston drives the shuttle hook along the deck; the force is applied to the aircraft, to aid in its take-off, through a tow cable or bridle that ties the aircraft to the shuttle hook. At the end of the take-off run, the aircraft is airborne and the bridle is automatically shed from it. A brake mechanism halts the shuttle and bridle.

In preparing the aircraft for a launch, the projecting shuttle hook is an obstacle to aircraft equipped with a nose wheel. The nose wheel on some craft, must be spotted ahead of the shuttle hook, and this requires a certain amount of maneuvering of the aircraft. Also, where the nose wheel is behind the hook it sometimes strikes the hook on take-off of the aircraft from the deck.

After a launch, the tow cable or bridle becomes disengaged from both the shuttle hook and the aircraft. The bridle and shuttle are then retracted by separate engines to the starting end of the deck slot in preparation for another launch. Since there are differences of weight between the bridle and shuttle, and difference in starting times and speeds of the engines, the retraction of the bridle is normally faster than the shuttle. Upon occasion, unless precautions are taken, the bridle snags on the shuttle equipment. Damage and injuries have followed.

Accordingly, it is an object of this invention to alleviate the conditions adverted to by providing novel improvements in catapult shuttles.

Various other objects will be apparent from the following description when read in light of the accompanying drawing.

In the drawing, which illustrates the preferred embodiment of the invention, and wherein similar reference numerals are used throughout the several views to designate corresponding parts, FIG. 1 is a perspective view showing an aircraft in broken lines on a launch deck having a launching mechanism employing the invention;

Figure 2:
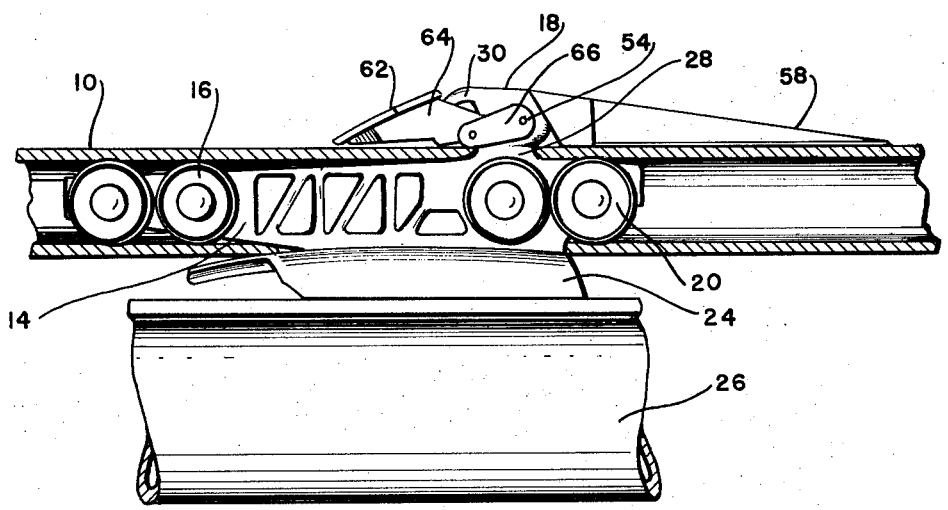
FIG. 2 is a longitudinal view through the deck showing the shuttle in side elevation.

Referring to the drawing, FIG. 1, a portion of a deck 10 is shown having a longitudinal slot 12. A shuttle is indicated in general at 14, FIG. 2, which has a carriage 16 mounted beneath the deck 10 and from this a shuttle hook 18 extends through the deck slot 12 and above the deck. Shuttle carriage 16 has wheels 20, mounted to roll in tracks 22 supported from the deck, to permit its movement when a force is applied to it through an arm 24 that connects it to a piston, not shown, is a catapult cylinder 26.

Shuttle hook 18 has a neck portion 28 that is secured, as by welds, to the top of the carriage 16. The hook's free end or toe 30 is directed forwardly as shown, FIG. 1, and a tow cable or bridle 32 is looped at its center in engagement with it. The ends of the bridle 32 are formed into eyes, 34 and 34, and are looped over rearwardly directed hooks, 36 and 36, extending from an aircraft 38. The aircraft is shown positioned in preparation of a launch.

On each side of deck slot 12, running parallel with it, there is a guide cable 40 carrying a sleeve like member or slider 42. A tie line 44 connects the bridle with the sliders 42.

On the forward side of the sliders 42, the guide cables 40 pass through an eye 45 on the end of a retract cable 46. The other end of the retract cable is led over a pulley 48 secured to the deck 10 and passes below the deck where it is connected to a bridle arresting and retracting engine, not shown.

The movement of shuttle 14 in a launch is transmitted to the aircraft 38 through the shuttle hook 18 and bridle 32. The sliders, 42, move forward on the guide cables 40 and push the retract cable 46 ahead of them. When the aircraft reaches a speed exceeding that of the shuttle, its hooks, 36 and 36, pull out of the bridle eyes, 34 and 34, severing its connection with the deck. The bridle is disconnected from the shuttle hook 18 but retained on the deck by the tie lines 42.

After a launch, the arresting engines halt the shuttle 14 and bridle 32 in a manner the description of which is not deemed necessary for the purposes of this invention. The retract engines then tow the bridle and shuttle back to the starting end of the deck slot. As previously mentioned, the bridle retraction speed is faster than that of the shuttle and it snags on the shuttle hook unless precautions are taken and the projecting hook is an obstacle to aircraft.

To avoid the referred to objections, the shuttle hook 18 has a slot 50 in the portion of its neck 28 that pierce its top. A connector bar 52 is pivotally secured at one end by a pin 54 in the slot 50. The other end of the bar 52 extends rearwardly and is secured by a pin 56 to a ramp 58 disposed to the back of the shuttle hook 18. Ramp 58 tapers downwardly into the deck at its rear and sides so that an aircraft wheel can readily ride up it and over the shuttle hook.

To avoid snagging the bridle on the shuttle hook 18 on retraction, a deflector 60 is provided for the forward or toe end of the shuttle hook. Deflector 60 has a top plate 62 that is adapted, in size, to furnish a forward ramp to the shuttle hook. Plate 62 is secured at its underside to sides, 64, that are separated sufficiently to enable them to receive the hook 18, and a toggle arm 66 is pivotally secured at one end by a pin 68 to each side 64. The other end of the toggle arm 66 is pivotally carried on the end of the forward pin 54 that passes through the shuttle hook 18.

Figure 3:
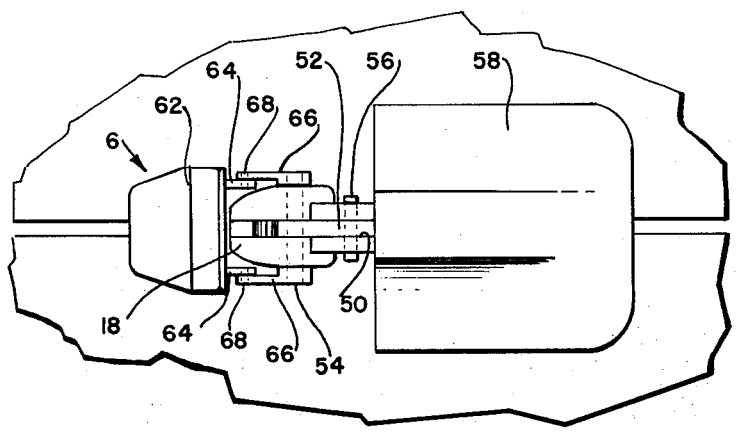
FIG. 3 is a plan view of the launching mechanism located above deck.

By this construction the deflector 60 is thus hinged so that it can be swung to the top of the shuttle hook, as shown in FIG. 1, and a bridle may be connected to the hook, as for launching an aircraft. On the other hand, the deflector 60 can be moved forward, as in FIGS. 2 and 3, to cover the bight of the shuttle hook to provide a ramp on its forward side, as is desired for retracting a bridle over the shuttle hook.

Both the deflector 60 and the rear ramp 58 move with the shuttle forwardly in a launch, and rearwardly, in retraction. Only the position of the deflector 60 is changed, which is accomplished manually, in accordance with the needs.

While only one embodiment of the invention has been

What is claimed is:

1. An aircraft launching shuttle for a landing surface comprising:
    (a) a carriage adapted to be movably supported beneath said landing surface;
    (b) a hook secured to said carriage and adapted to extend above said landing surface;
    (c) and deflector means pivotally secured to said hook movable into a first position to provide a forwardly extending ramp rising from said landing surface to the top of said hook for negotiating said hook from the front thereof, and movable into a second position over said hook for permitting a connection to be made therewith.

2. The shuttle of claim 1 including means secured to the rear of said hook extending rearwardly and downwardly therefrom to permit negotiating said hook from a rearward direction.

3. In an aircraft launching shuttle having a forwardly projecting shuttle hook extending above a launching surface for connection therewith to an aircraft, a deflector comprising:
    (a) a member adapted to provide a forwardly extending ramp from said launching surface to the top of said shuttle hook;
    (b) a pair of toggle arms pivotally secured at one end to said member;
    (c) and means pivotally securing said toggle arms at their other ends to the sides of said hook whereby said deflector may be moved from a first position furnishing a forward ramp for negotiating said hook and movable to a second position over said hook for permitting a connection therewith.

4. The device of claim 3 including means secured to the rear of said hook extending rearwardly and downwardly therefrom to permit negotiating said hook from a rearward direction.

5. The device of claim 4 wherein the rear side of said hook has a slot and said last named means includes a ramp and a connecting bar pivotally secured at one end in said slot and at the other end to said ramp.

6. In an aircraft launching shuttle having a hook for attaching a bridle thereto and extending above a launching surface:
    (a) ramp means fixedly secured at the rear of said hook to permit negotiating thereof from a rearward direction by the wheels of an aircraft;
    (b) and means pivotally secured to said hook movable into a first position providing a ramp for negotiating said hook from the front thereof, and movable into a second position over said hook to permit connecting a bridle to said hook.

References Cited in the file of this patent
UNITED STATES PATENTS

| | | |
|---|---|---|
| 1,432,815 | Weinberg | Oct. 24, 1922 |
| 2,523,314 | Maxson et al. | Sept. 26, 1950 |
| 2,862,681 | Rolandelli et al. | Dec. 2, 1958 |
| 3,089,669 | Broudo | May 14, 1963 |

FOREIGN PATENTS

| | | |
|---|---|---|
| 854,089 | France | Jan. 2, 1940 |